(12) United States Patent
Bosshart (10) Patent No.: US 10,467,217 B2
(45) Date of Patent: Nov. 5, 2019

(54) LOOP DETECTION IN CUCKOO HASHTABLES

(71) Applicant: TEXAS INSTRUMENTS INCORPORATED, Dallas, TX (US)

(72) Inventor: Patrick William Bosshart, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 816 days.

(21) Appl. No.: 14/219,581

(22) Filed: Mar. 19, 2014

(65) Prior Publication Data

US 2015/0269279 A1    Sep. 24, 2015

Related U.S. Application Data

(60) Provisional application No. 61/803,252, filed on Mar. 19, 2013.

(51) Int. Cl.
*G06F 16/22* (2019.01)

(52) U.S. Cl.
CPC ......... *G06F 16/2255* (2019.01); *G06F 16/22* (2019.01)

(58) Field of Classification Search
USPC ........................................................ 707/798
See application file for complete search history.

(56) References Cited

U.S. PATENT DOCUMENTS

| 8,443,354 B1* | 5/2013 | Satish | G06F 8/65 717/104 |
| 9,053,032 B2* | 6/2015 | Sengupta | G06F 12/0862 |
| 2009/0080452 A1* | 3/2009 | Ra | H04L 45/00 370/419 |
| 2011/0227790 A1* | 9/2011 | Li | G01S 1/042 342/386 |

(Continued)

OTHER PUBLICATIONS

Reinhard Kutzelnigg ("A further analysis of Cuckoo Hashing with a Stash and Random Graphs of Excess": (Institute of Discrete Mathematics and Geometry, Vienna University of Technology, Wien, Austria received Aug. 11, 2009, revised Mar. 21, 2010, accepted Jul. 26, 2010: pp. 1-23; Kutzelnigg hereinafter).*

(Continued)

*Primary Examiner* — Sherief Badawi
*Assistant Examiner* — Raheem Hoffler
(74) *Attorney, Agent, or Firm* — Ebby Abraham; Charles A. Brill; Frank D. Cimino (57) ABSTRACT

A system includes a first storage, a second storage, and a processor. The first storage is configured to store a Cuckoo hash table which includes a plurality of locations. The second storage is configured to store a graph including a plurality of nodes. The processor coupled to the first storage and the second storage is configured to map each of the locations in the Cuckoo hash table to each of the nodes in the graph, and to determine whether a first entry to be added to a first location in the Cuckoo hash table creates a loop in the graph by executing a filter module. More particularly, the processor is to execute the filter module by detecting a (Continued)

presence of the loop before the first entry to occupy the first location in the Cuckoo hash table, the first location associated with a node, in the graph, occupied by a second entry.

16 Claims, 6 Drawing Sheets

(56) References Cited

U.S. PATENT DOCUMENTS

| | | | | |
|---|---|---|---|---|
| 2014/0007250 A1* | 1/2014 | Stefanov | ................ | G06F 21/60 726/26 |
| 2015/0244842 A1* | 8/2015 | Laufer | ................... | H04L 69/22 370/392 |

OTHER PUBLICATIONS

Kim, E. & Kim, M. (Cluster Computing (2014) 17: pp. 665-680. doi: 10.1007/s10586-013-0343-y: Enhanced chained and Cuckoo hashing methods for multi-core CPUs: Jan. 28, 2014).*

\* cited by examiner

LOOP DETECTION IN CUCKOO HASHTABLES

CROSS-REFERENCE TO RELATED APPLICATION

This application claims the benefit of priority under U.S.C § 119(e) of U.S. Provisional Application 61/803,252 (TI-73509PS) filed Mar. 19, 2013 and incorporated herein by reference.

BACKGROUND

A communication system, such as a network router, a computer, a packet switching system, and other types of communication devices, may use a hash function and a hash table to perform lookup operations on a set of data to identify a matching item. Typically, a hash function is used where the possible values of the data is greater than a size of memory to use for storing the data.

SUMMARY

Systems and methods to detect a presence of a loop being created before inserting an entry to a Cuckoo hash table are disclosed herein. In an embodiment, a method includes generating, by a processor, a graph including a plurality of nodes, wherein each node corresponds to a location in the Cuckoo hash table. The method further includes based on a first node not being occupied, adding, by the processor, a first entry to the first node, the first node corresponding to a location associated with a first hash address calculated by a first hash generator, wherein one or more hash generators other than the first hash generator configured to generate alternate hash addresses for the first entry, each of the alternate hash addresses associated with one of alternate nodes for the first entry in the graph. Still further, the method includes based on the first node being occupied by a second entry, determining, by the processor, whether to replace the second entry with the first entry and to evict the second entry to alternate nodes for the second entry, wherein each of the second entry's alternate nodes is associated with an alternate hash address calculated by the hash generators of the Cuckoo hash table. More particularly, each of the nodes occupied by an entry is associated with a depth greater than zero, the depth being a minimum value of how many costs the entry occupying the node needs to travel in the graph to find an unoccupied node, wherein one cost value corresponds to a hop from a node to one of the node's alternate nodes.

In another embodiment, a system includes a first storage, a second storage, and a processor. The first storage is configured to store a Cuckoo hash table which includes a plurality of locations. The second storage is configured to store a graph including a plurality of nodes. The processor coupled to the first storage and the second storage is configured to map each of the locations in the Cuckoo hash table to each of the nodes in the graph, and to determine whether a first entry to be added to a first location in the Cuckoo hash table creates a loop in the graph by executing a filter module. More particularly, the processor is to execute the filter module by detecting a presence of the loop before the first entry to occupy the first location in the Cuckoo hash table, the first location associated with a node, in the graph, occupied by a second entry.

In accordance with a further embodiment, a non-transitory, computer readable storage device containing executable instructions that, when executed by a processor, causes the processor to generate a graph including a plurality of nodes, wherein each node corresponds to a location in a Cuckoo hash table. The processor executes the instructions further causes the processor to, based on a first node not being occupied, add a first entry to the first node, the first node corresponding to a location associated with a first hash address calculated by a first hash generator, wherein one or more hash generators other than the first hash generator configured to generate alternate hash addresses for the first entry, each of the alternate hash addresses associated with one of alternate nodes for the first entry in the graph, and calculate a depth for each of the alternate nodes for the first entry and nodes pointing to the first entry. Still further, the processor executes the instructions causes the processor to, based on the first node being occupied by a second entry, determine whether to replace the second entry with the first entry and to evict the second entry to alternate nodes for the second entry, wherein each of the second entry's alternate nodes is associated with an alternate hash address calculated by the hash generators of the Cuckoo hash table. More specifically, each of the alternate nodes for the entry occupying a node is configured to function as one of the nodes to which the entry, while being evicted from the node, can go. Each of the nodes occupied by an entry is associated with the depth greater than zero, the depth being a minimum value of how many costs the entry occupying the node needs to travel in the graph to find an unoccupied node, wherein one cost value corresponds to a hop from a node to one of the node's alternate nodes. Still more specifically, the first node occupied by the second entry is associated with a prior depth, and if the second entry is replaced by the first entry to occupy the first node, the first node occupied by the first entry is associated with a preliminary new depth.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A trend of ever increasing customer demand for greater speed and capacity in a communication system has prompted the communications industry to develop technologies to satisfy such customer demand. In general, one of the technologies used is packet switching technology.

A network device, such as a switch or router, generally receives, processes, and forwards or discards a packet based on one or more criteria. The criteria may include a type of protocol used by the packet, addresses of the packet (e.g., source and/or destination), and type or quality of service being requested. Before these operations can be performed, a packet classification operation typically includes one or more lookup operations to be performed on the packet so as to enable the network device to distinguish packets belong to different network services. More particularly, there are various network services that require packet classification, such as routing, access-control in firewalls, policy-based routing, and traffic billing.

The lookup operation may include multiple individual lookups on a field of the packet. For example, the lookup operation may include non-trivial dependencies between different field lookups, such as an internet protocol (IP) field and multi-protocol label switching (MPLS) filed. Generally, the packet may go through multiple lookup operation before making a forward decision.

A hash function and a hash table may be used to efficiently perform such lookup operations on a field of the packet. Standard issues to implement those operations using hash functions may include the time for inserting a data entry, or simply entry. For example, when two entries are hashed to be stored in a same hash location, a hash collision may occur. Several structures and mechanisms (e.g., algorithm) have been proposed to resolve this issue, such as using a linked list of entries for storing multiple entries in a bucket. However, implementing the linked lists generally requires a memory read operation for each of the linked entries. Such memory read operations take time and consume system resources.

A technique known as Cuckoo hashing is an algorithm in computer programming for resolving hash collisions in a hash table. Generally, the Cuckoo hashing uses two hash tables with each hash location having a single entry. Entries are inserted sequentially into the location of the hash tables. For a first entry to be added, it is added to a first hash table at a first position (e.g., hash location) according to a first hash function. If the first position is empty prior to the addition, then the first entry is successfully inserted into the first position. Otherwise, a second entry previously stored at the first position will be evicted to a second position according to a second hash function. As such, the first position is empty for the first entry to be added. However, the second entry may finally result in a failure of finding an empty position, which causes the addition of the first entry to create an infinite loop. This infinite loop may become an issue to a communication system implementing this Cuckoo hashing. An illustrated example of the loop will be provided below.

Embodiments disclosed herein provide systems and methods to detect a presence of a loop before an entry is added to a Cuckoo hash table. Additionally, a generalized N-way Cuckoo hash table preferably is mapped to a graph in which each of a plurality of nodes representing a hash location in the Cuckoo hash table concurrently updates its information (e.g., a depth) after a status has changed (e.g., occupied or unoccupied). In a further embodiment, after being determined that the entry to be added may create a loop, the entry may be stored in a stash of the Cuckoo hash table for further use. Incorporating the disclosed systems and methods with the stash may advantageously optimize the performance of the Cuckoo hash table as a whole.

Figure 1A:
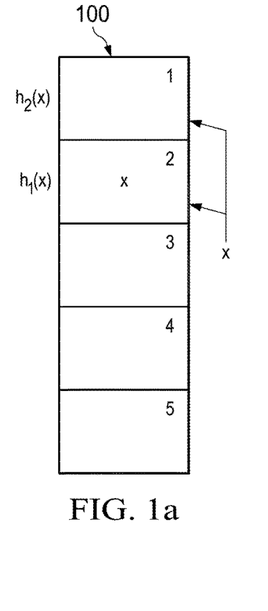
FIGS. 1a-1j show an example of a loop being created in a Cuckoo hash table in accordance with various embodiments.
Figure 1B:
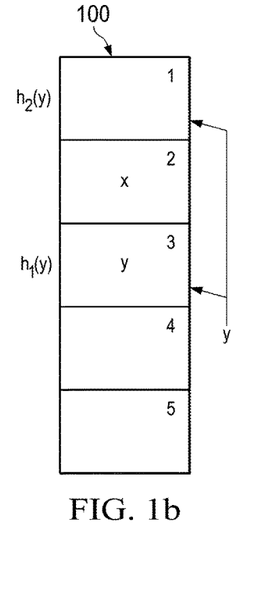
Figure 1C:
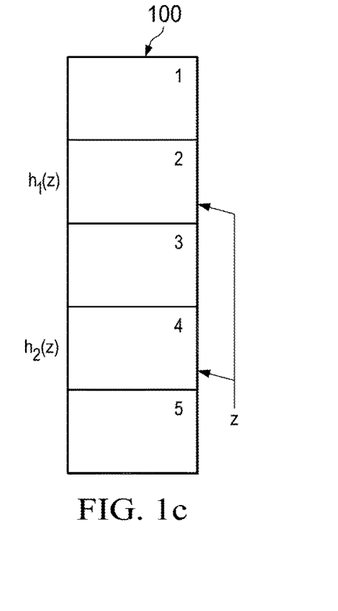

FIGS. 1a-1j show an illustrated example of how a loop undesirably may be created. Starting with FIG. 1a, FIG. 1a shows a Cuckoo hash table 100 including five locations 1, 2, 3, 4, and 5. In some preferred embodiments, as shown in FIG. 1a, when an entry "x" is to be added to the Cuckoo hash table 100, two hash addresses, $h_1(x)$ and $h_2(x)$, are calculated by two respective hash generators $h_1$ and $h_2$. These two hash addresses $h_1(x)$ and $h_2(x)$ correspond to the location 1 and location 2 respectively in the Cuckoo hash table. Since locations 1 and 2 are empty, the entry x is successfully added to location 2, based on a priority to choose a hash address ($h_1(x)$) by a first hash generator (h1). As such, the location 1 corresponding to $h_2(x)$ may be assigned as the entry x's alternate location. Similarly, in FIG. 1b, another entry "y" is to be added to the Cuckoo hash table 100. Two choices for the entry y's hash addresses, $h_1(y)$ and $h_2(y)$ have been provided as corresponding to the locations 3 and 1, respectively. As mentioned above, the entry y will be inserted to the location 3 based on the hash address calculated by the first hash generator. FIG. 1c shows another entry "z" to be inserted to one of its corresponding hash addresses, $h_1(z)$ and $h_2(z)$. If the entry z is added into the location 2 corresponding to $h_1(z)$, a collision will occur since location 2 is already occupied with "x" as shown in the left and the central panels of FIG. 1a. In following the priority rule mentioned above (i.e., the first hash generator generates a first hash address as a priority choice for any of entries to be added), the entry x will be evicted from location 2 to the entry x's alternate location.

Figure 1D:
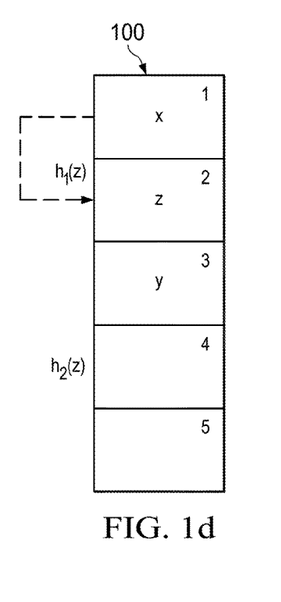
Figure 1E:
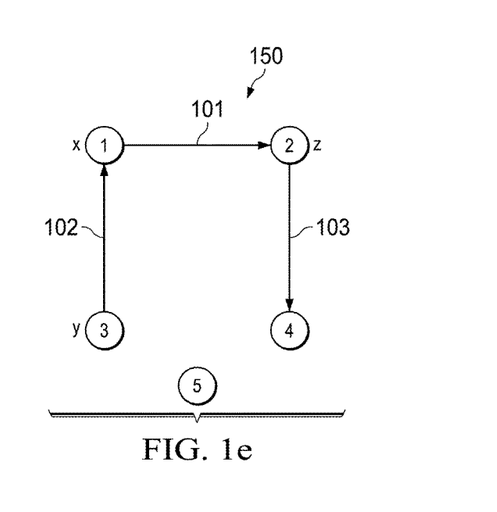

FIGS. 1d and 1e show an example of an eviction trail and a mapped graph 150 corresponding to a dynamic operation of the Cuckoo hash table 100. As shown in FIG. 1d, to add entry z to the Cuckoo hash table 100, the entry x must first be evicted to its alternate location, location 1. A dotted line shown in FIG. 1d illustrates that the entry x may later be evicted from location 1 back to location 2, since the location 2 is as calculated as one of the entry x's hash locations (i.e., the locations 1 and 2 as shown in FIG. 1a) corresponding to the hash addresses, $h_1(x)$ and $h_2(x)$. In some preferred embodiments, when the entry x is located at one of its hash locations, other hash locations other than the current location being occupied by the entry x may be defined as the entry x's alternate locations.

Referring to FIG. 1e, FIG. 1e shows the graph 150 corresponds to the Cuckoo hash table 100. The graph 150 includes five nodes labeled as 1, 2, 3, 4 and 5, and each node corresponds with one of the locations in the Cuckoo hash table 100. For example, the node 1 is associated with the location 1 in the Cuckoo hash table 100, node 2 is associated with location 2, and so on. The graph 150 further includes three "directed edges", 101, 102 and 103. Each directed edge may be configured as a possible path for an entry to be relocated from one node to that entry's alternate node. Further, the alternate node in the graph 150 is associated with the alternate location in the Cuckoo hash table 100. Per the example above, the entry x in FIG. 1b is shown occupying location 1. The entry x may be evicted to the location 2 as indicated by directed edge 101 which is an arrow pointing from node 1 to node 2. Similarly, directed edge 102 means that the entry y, currently occupied by node 3 may be evicted from node 3 to node 1. The directed edge 103 means that the entry z currently occupied by node 2 may be evicted from node 2 to node 4.

Figure 1F:
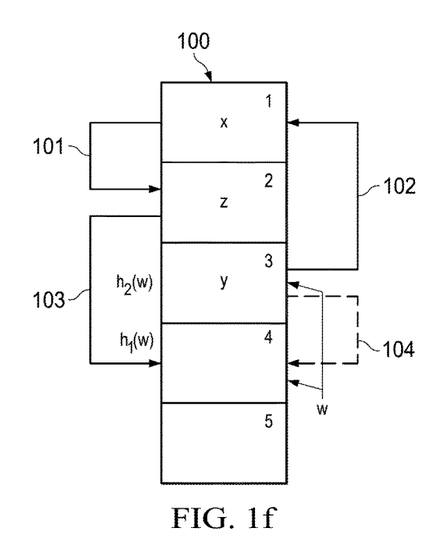
Figure 1G:
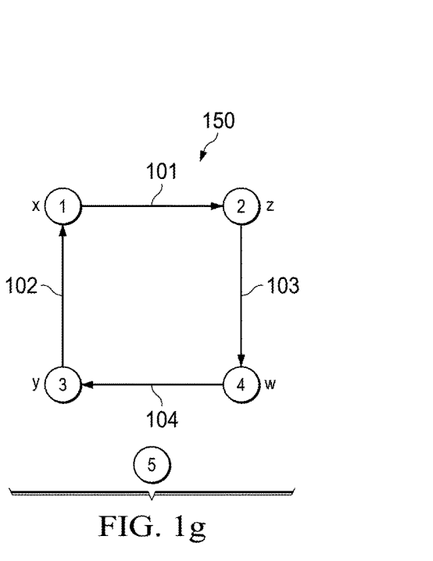

FIGS. 1f and 1g show an example of a new entry "w" to be added to the Cuckoo hash table 100 and the graph 150 being dynamically updated according to the Cuckoo hash table 100. The entry w also has two options for locations of its hash addresses, $h_1(w)$ and $h_2(w)$, corresponding to location 4 and location 3 respectively. As shown in FIG. 1f, location 4 is empty, so that the entry w is able to occupy the location 4 without triggering another eviction. FIG. 1g shows the corresponding graph 150. The graph 150 in FIG. 1g includes a directed edge 104, which indicates that the entry w currently at node 4 but may be evicted to node 3.

Figure 1H:
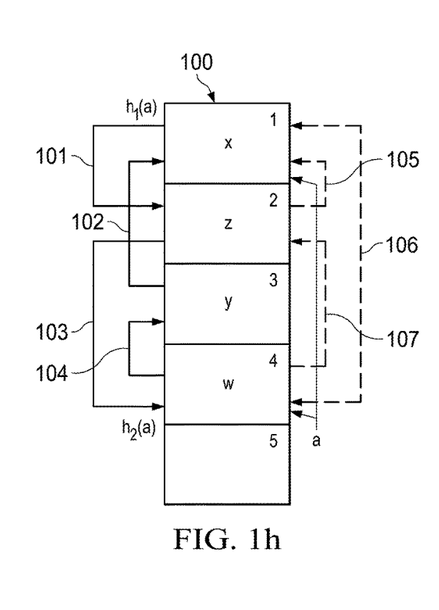
Figure 1I:
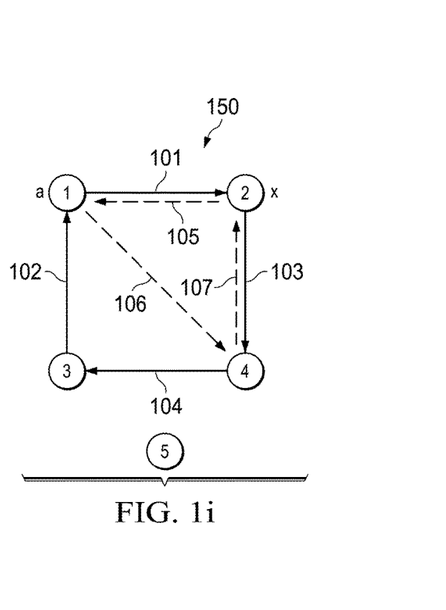

FIG. 1h shows an example of another entry "a" to be added to the Cuckoo hash table 100 and the corresponding update to graph 150. Again, the entry a has two hash addresses, $h_1(a)$ and $h_2(a)$, corresponding to location 1 and location 4 respectively. As shown in FIG. 1h, location 1 and location 4 are currently occupied by entries x and w respectively. To add the entry a to location 1 in the hash table 100, entry x currently at location 1 will be evicted to entry 2. Further the eviction of entry x to entry 2 will cause the eviction of entry z at from location 2 to location 4, and so on. FIG. 1i shows a corresponding change of the graph 150 after adding the entry a to the Cuckoo hash table 100. Entry a is added to the location 1, which in turn causes the graph to be updated to illustrate that the entry for a is at node 1 in the graph 150. A directed edge 106 is created for the entry a in the node 1 and is pointed towards node 4 (the alternative node for entry a). Inclusion of entry a into node 1 causes entry x to be evicted from node 1 to node 2, and a corresponding directed edge 105 is created for the entry x now occupying node 2 and pointing back to node 1. Entry z is evicted from node 2 (due to inclusion of entry x in node 2) to node 4, and a corresponding directed edge 107 is created for entry z occupying node 4 and pointing back to node 2. Entry w is also evicted from the node 4 (due to inclusion of entry z at node 4) to node 3, which currently is occupied for entry y. Entry y would then be evicted from node 3 and transferred to node 1, but the inclusion of entry a in node 1 originally is what caused the eviction and relocation of the entries in the first place. The process thus has circled back on itself in a loop.

Figure 1J:
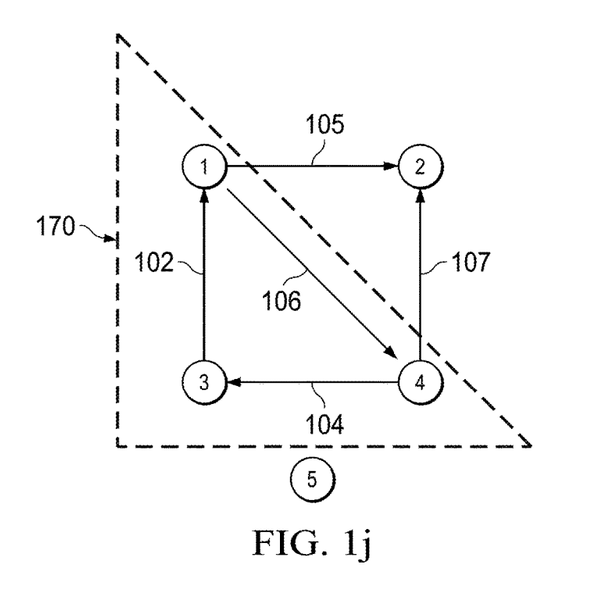

FIG. 1j shows an example of the graph 150 including a loop 170 being created in accordance with various embodiments. Continuing with the example illustrated in FIG. 1d, adding the entry a to node 1 causes the loop 170 to be created as shown in FIG. 1e. In some preferred embodiments, the loop may be defined as a path having a starting point and an ending point located at the same node. For example, loop 170 includes the nodes 1, 4, and 3, and directed edges 106, 104 and 102. Choosing, for example, node 1 as the starting point, tracing the directed edges (106, 104, and then 102) will always end up at the same node (e.g., node 1). That is, evicting the entry from node 3 to node 4 will cause the entry currently at node 4 to be evicted to node 3 and the entry from node 3 to be evicted to node 1 which then causes the entry at node 1 to be evicted to node 4 and so on. The eviction process repeats in an infinite loop.

Generally, acknowledging a loop being created after adding an entry to the Cuckoo hash table may consume a certain amount of cost to read and/or write memory, which in turn may affect performance of a communication system implementing the Cuckoo hash table. Thus, a system or a mechanism (e.g., algorithm) that is capable of detecting the a priori possibility as to whether the entry may cause a loop may advantageously enhance the performance of the communication system implementing the Cuckoo hash table. In this regard, embodiments disclosed herein provide systems and methods to detect the presence of a loop before an entry is added to the Cuckoo hash table. Further, a generalized N-way Cuckoo hash table is mapped to a graph including a plurality of nodes representing hash locations in the Cuckoo hash table. Each of the node's information (e.g., the depth) is updated upon the node's status changing. The change in status may be, for example, from occupied (node occupied by an entry) to unoccupied (no entry), or vice versa.

Figure 2:
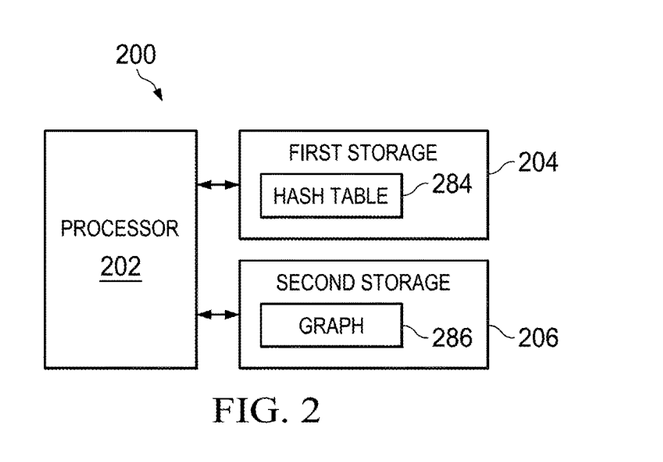
FIG. 2 shows a block diagram of a system to implement the Cuckoo hash table in accordance with various embodiments.

FIG. 2 shows a system 200 configured to implement operation of the Cuckoo hash table in accordance with various embodiments. The system 200 includes a processor 202, a first storage 204, and a second storage 206. The system 200 may be a mobile computing device, or any suitable device to implement the Cuckoo hash table. For example, the system 200 includes a portable computing device such as a laptop computer, a netbook, a gaming device, and/or a portable media player. Further, the system 200 may represent a group of processing units or other computing devices.

Still referring to FIG. 2, in some preferred embodiments, the first storage 204 is configured to store the Cuckoo hash table 284. The processor 202 is configured to access the Cuckoo hash table stored in the first storage 204 to generate the corresponding graph. Processor 202 executes instructions to concurrently update the graph, and store the updated graph 286 in the second storage 206. In a preferred embodiment, the graph 286 is stored as a data set including all the nodes and specified directed edges. Further, the Cuckoo hash table may be created by an external server (not shown), and the processor 202 retrieves the Cuckoo hash table from the external server to save the Cuckoo hash table into the first storage 204. In some alternate embodiments, the system 200 may create the Cuckoo hash table by itself based on any suitable data received and/or stored in the system 200. Details of how the processor creates the graph based on the Cuckoo hash table, and further detects the loop will be described in a method with respect to FIG. 5.

In some preferred implementations, the first storage 204 to store the Cuckoo hash table may be a first type of memory, and the second storage 206 to store the graph may be a second type of memory different from the first type. For example, if the Cuckoo hash table is stored in an on-chip array of static random-access memory (SRAM), and the graph is stored in an external commodity dynamic random-access memory (DRAM). The processor 202 may perform all computations regarding to updating the graph and subsequently direct an exact minimal sequence that is required for additions and relocations of entries in the Cuckoo hash table stored in the SRAM. As such, for some suitable applications, since the SRAM is configured to be accessed with a higher bandwidth and a faster speed compared to the DRAM, the system 200 may advantageously best use available resources in the Cuckoo hash table by filling the hash table to its maximum capacity. However, in some alternate applications, if a larger size of Cuckoo hash table is required, the first storage 201 and the second storage 206 may be resided in a same memory or storage device.

Figure 3:
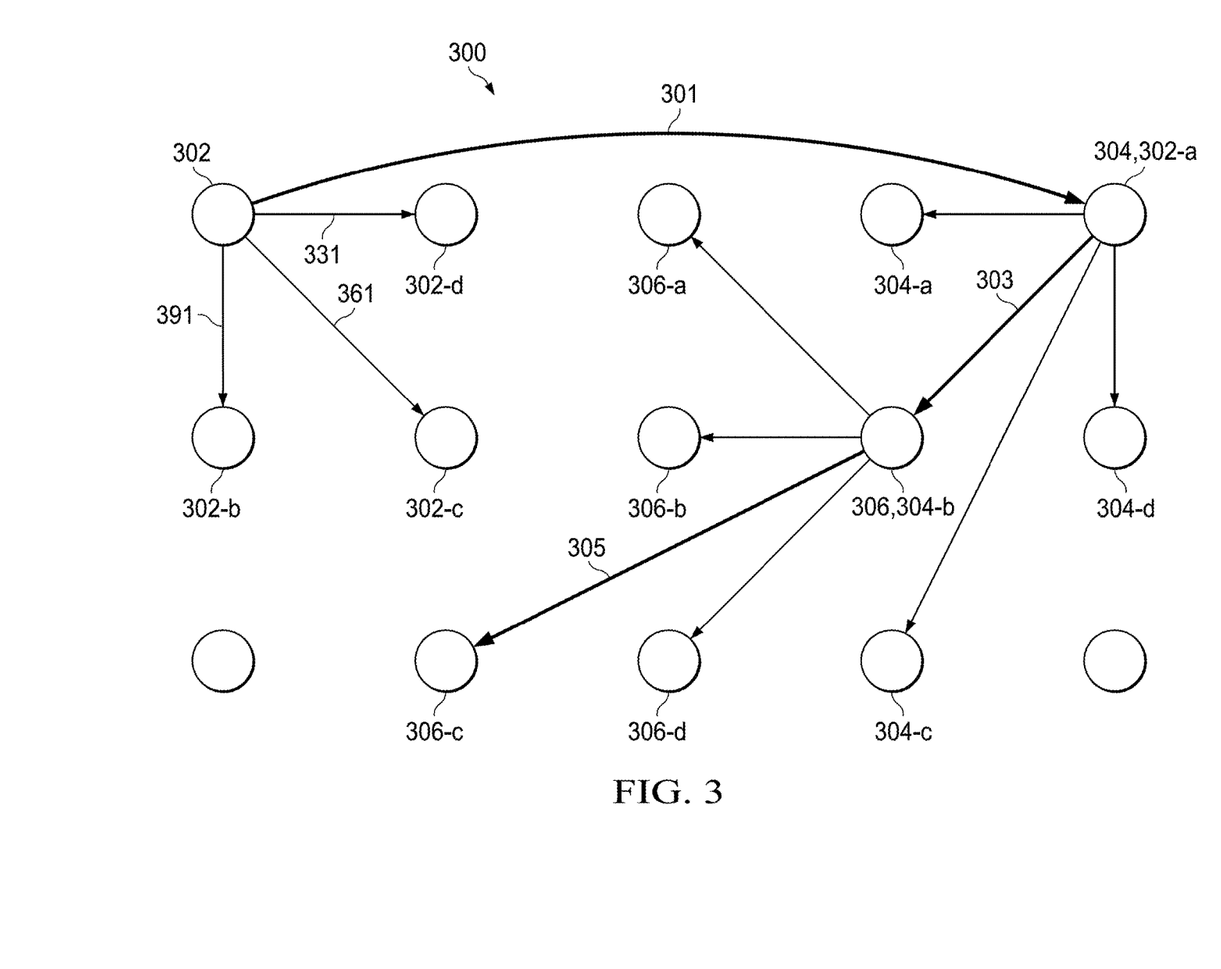
FIG. 3 shows an example of a graph corresponding to the Cuckoo hash table in accordance with various embodiments

FIG. 3 shows an exemplary graph 300, generated by the processor 202, based on a Cuckoo hash table in accordance with various embodiments. The graph 300 includes 15 nodes (e.g., 302, 302-a or 304, 302-b, 302-c, 302-d, 304-a, 304-b or 306, 304-c, 304-d, 306-a, 306-b, 306-c, and 306-d), directed edges (e.g., 301, 303 and 305). In general, for an N-way Cuckoo hash table to be implemented, there are N ways for an entry to be added into the hash table, and each way includes a data array of size S. More particularly, each of the N ways is associated with a hash generator configured to hash a hash address for the entry to be added, and each of the hash addresses is associated with a location in the Cuckoo hash table. As such, there are N×S nodes in the graph. For example, if there are five ways and each way includes three data arrays in the Cuckoo hash table on which the graph 300 is based, the graph 300 includes 15 nodes as shown in FIG. 3.

As described above, continuing with the exemplary graph 300, for each entry to be added to the Cuckoo hash table, there are five possible locations for the entry to be added. If the entry is being chosen to be placed in one of the five locations which corresponds to node 302, there are four other choices for the entry to go. These four choices for the entry occupying at the node 302 are the nodes 302-a or 304, 302-b, 302-c and 302-d, which, in some preferred embodiments, are referred to as alternate nodes for the node 302. Analogously, an entry at the node 304 includes four alternate nodes 304-a, 304-b or 306, 304-c, 304-d, and an entry at the node 304 includes four alternate nodes 306-a, 306-b, 306-c, and 306-d.

Still referring to FIG. 3, the directed edge (e.g., 301, 303 and 305) is generally referred to as a directed path pointing from a node which is currently occupied by an entry to one of the entry's alternate nodes. For example, for the node 302, four directed edges are shown in FIG. 3: the directed edge 301 pointing from the node 302 to the node 304, the directed edge 331 pointing from the node 302 to the node 302-d, the directed edge 361 pointing from the node 302 to the node 302-c, and the directed edge 391 pointing from the node 302 to the node 302-b. Similarly, the nodes 304 and 306 have their respective four directed edges.

In a preferred embodiment, each of the nodes in the graph 300 is associated with a depth. The depth can be defined as follows: for a node being unoccupied with any entry, the depth for the node is zero; if the node is occupied by an entry, the depth for the node may be configured as a minimum value of how many costs the entry occupying the node needs to travel in the graph 300 to find an unoccupied node, wherein one cost value corresponds to a hop from a node to one of the node's alternate nodes. For the purpose of easy illustration, one cost value is defined as value "1" hereafter.

For example, the node 302 is currently occupied by a first entry, and the node 302 includes a value of the depth, 32. If the node 302 is later occupied by a second entry, which means that the first entry has been replaced by the first entry at the node 302 and replaced by a second entry. Consequently, the first entry is evicted and the depth 32 means that the first entry needs to hop 32 times from the node 302 to an occupied node. Further, an eviction trail, or a path, for the node 302 may be generated, by the processor 202, wherein the path is defined as a path stating from the node where the eviction being initiated, traveling along the node's directed edges to a subsequent node, if needed, traveling along the subsequent node's directed edges, and continuing the traveling until an unoccupied node is found. For another example, one of the eviction trails for an entry at the node 302 may include the directed edge 301, the node 304, the directed edge 303, the node 306, the directed edge 305, and the node 306-c as an ending point, if the node 306-c is not occupied by any entry. As such, the depth of the node 302 may be not greater than 3.

Referring again to FIG. 3, in a further embodiment, a first node pointing to a node may be referred to as the node's successor, and the alternate nodes of the node may be referred to as the node's predecessors. Additionally, two different depths, prior depth and preliminary new depth are defined herein. The prior depth may be referred to as a depth for an entry to be replaced and/or evicted at a node; and the preliminary new depth may be referred to as a depth for an entry to be added at the node. For example, the node 306 includes a successor node 304 and four predecessors: nodes 306-a, 306-b, 306-c, and 306-d.

Figure 4:
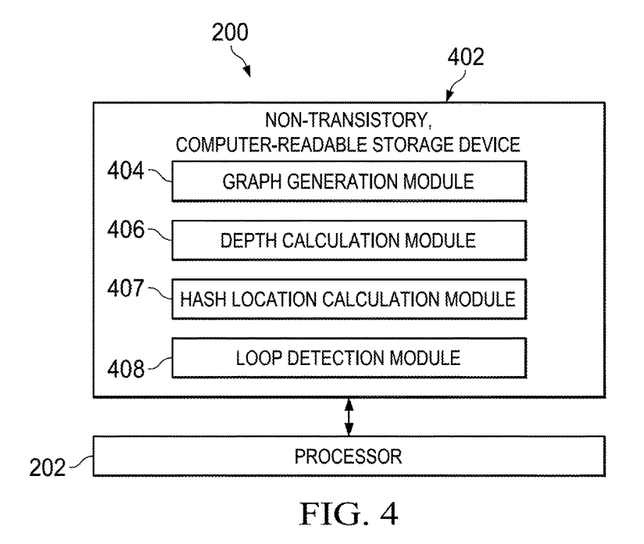
FIG. 4 shows an example of a system to implement disclosed detection of a loop in accordance with various embodiments.

FIG. 4 shows a suitable example of an implementation of the system 200 in which a processor 202 is coupled to a non-transitory, computer-readable storage device 402. The non-transitory, computer-readable storage device 402 may be implemented as volatile storage (e.g., random access memory), non-volatile storage (e.g., hard disk drive, optical storage, solid-state storage, etc.) or combinations of various types of volatile and/or non-volatile storage. The processor 202 is defined to be a processor executing modules and/or instructions. That is, the system 200 is not only software.

As shown in FIG. 4, the non-transitory, computer-readable storage device 402 includes a graph generation module 404, a depth calculation module 406, a hash location calculation module 407, and a loop detection module 408. Each module of FIG. 4 may be executed by the processor 202 to implement the functionality described herein. The functions to be implemented by executing the modules 404, 406, 407 and 408 will be described with reference to the flow diagrams of FIG. 5.

Figure 5:
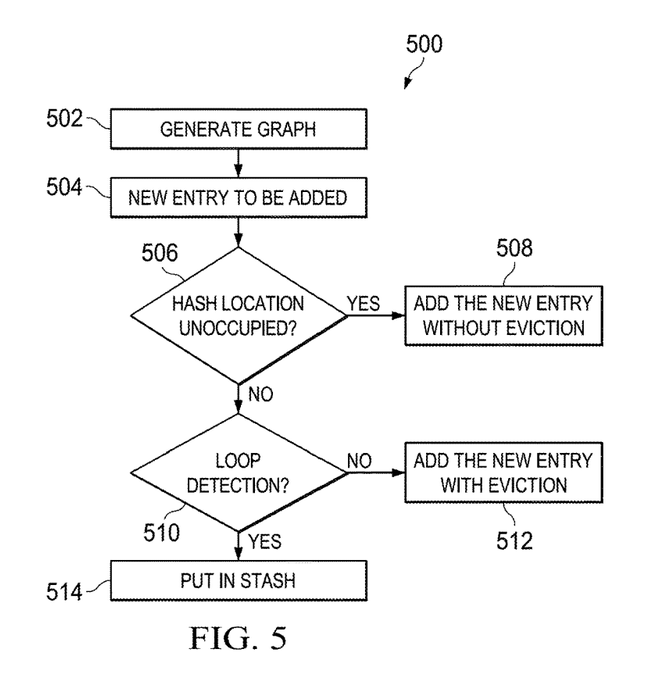
FIG. 5 shows a method to detect a presence of a loop in a Cuckoo hash table in accordance with various embodiments.

FIG. 5 shows a flow diagram for an illustrative method 500 implemented by, for example, the system 200 in accordance with various embodiments. As a result of executing the graph generation module 404 by the processor 202, the method 500 begins at block 502. In block 502, the processor 202 generates a graph (e.g., 150 and 300) including a plurality of nodes (e.g., 302, 304 and 306), wherein each of the nodes corresponds to a location (e.g., locations 1, 2, 3, and 4 in FIG. 1a-1d) in the Cuckoo hash table. In some preferred embodiments, after the graph being generate, the processor 202 may accordingly execute the depth calculation module 406 to calculate the depth for each of the nodes in the graph. For example, referring to FIG. 3, if the node 302 is empty (i.e., unoccupied), the processor 202 executes the depth calculation module 406 to assign a value of "0" as the node 302's depth. Still referring to FIG. 3, if the node 304 is occupied by an entry, the processor 202 executes the depth calculation module 406 to calculate how many hops (each hop equal 1) the entry occupying the node 304 needs to travel in the graph 300 to find an unoccupied node.

In block 504, while the processor 202 acknowledges that a new entry is going to be added into the Cuckoo hash table, the processor 202 subsequently executes the hash location calculation module 407. As a result of executing the hash location calculation module 407, the processor 202 is configured to calculate, by using hash generators, all possible hash locations in the Cuckoo hash table into which the new entry may be inserted. The method 500 continues with block 506 to determine, by the processor 202 executing the graph generation module 404, whether one of the hash locations is unoccupied. The processor 202 first associates the calculated hash locations to corresponding nodes in the graph, and visits each of the nodes sequentially to determine if one of the nodes is unoccupied. If there is a node is unoccupied, the method 500 routes to block 508. Otherwise, the method 500 continues with block 510 to determine whether a loop exists after adding the entry to the graph or the corresponding Cuckoo hash table.

If the node in the graph corresponding to the unoccupied hash location is found, in block 508, the processor 202 executes the graph generation module 404 to add the new entry into the node. Accordingly, the processor 202 may execute the depth calculation module 406 to calculate the depths for the node, and the node's successors and predecessors.

If none of the nodes in the graph corresponding to the calculated hash location is found unoccupied, in block 510, the processor 202 executes the loop detection module 408 to detect whether a loop may be created after adding the new entry to the graph. As a result of executing the loop detection module 408, the processor 202 initiates a series of filtering processes to detect the presence of a loop.

Figure 6:
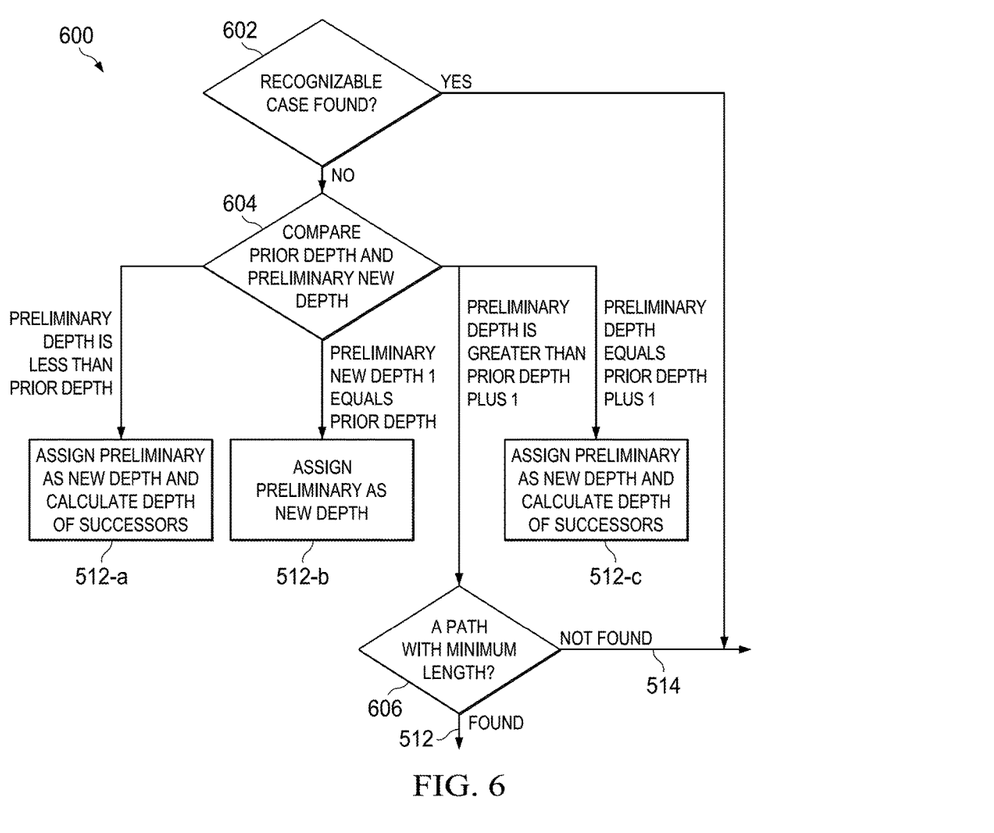
FIG. 6 shows a method that illustrates further details to detect a presence of a loop in a Cuckoo hash table in accordance with various embodiments.

FIG. 6 shows a method 600 to further illustrate details of block 510 in method 500. The method 600 starts with block 602 for the processor 202 to recognize cases where the loop will always be created. Consider a first node at current depth D, which means that there is a path of length D down to an unoccupied node. At any depth D' lower than D, if there is only one node at that depth that has any successors, then that node is in the first node's eviction trail, and that node may get new predecessors. Those predecessors may very likely not point to nodes with a lower depth, since they are far less numerous than nodes with a larger depth. As a result, after addition of the first node, the first node's depth will be larger than D', there will be no nodes at depth D' with successors. Consequently, all nodes at depths above D' will become unreachable. When a node is "unreachable", it is meant that the node may be in a loop, and thus the method 600 routes to block 514. Details of block 514 will be explained below. The test at each depth may optionally be simplified to test if there is only one node at that depth, rather than only one node with successors at that depth. This is true for depth ranging from D−1 to 0. At depth D, if there is only one node with successors, and that is the first node, it will become unreachable. If the first node is not the node with successors, it is not the node through which all nodes of greater depth connect to depth 0, so changing its predecessors will have no effect. So the additional test at the first depth D is that the single node at that depth with successors is actually the one being used for the eviction and addition. Similarly to the test for a lower depth, the test at depth D can optionally be simplified to simply a test that there is only one node at this depth. But the performance gain by simplifying the test is counterbalanced by its poorer filtering. This filter requires the maintaining of the histogram of node depths, so must be updated when nodes change depths, or when nodes go from having no successors to some or vice versa.

Still referring to the method 600, if the processor 202, in block 602, acknowledges that no recognizable case of the loop exists, the processor 202, in block 604, further compares the first node's prior depth and the preliminary new depth. If the preliminary new depth is not greater than the prior depth plus 1 (i.e., value of one cost), in some preferred embodiments, the processor 202 may determine that a lack of a loop, and thus the method 600 routes to block 512 to add the new entry in the Cuckoo hash table. More particularly, depending on a different criterion to be satisfied, block 512 may further include three blocks 512-a, 512-b and 512-c as shown in FIG. 6. For example, if the preliminary new depth is less than the prior depth, the processor 202, in block 512-a, replaces the original entry occupying the first node with the new entry to occupy the first node, and assign the preliminary new depth as a new depth of the first node while being occupied by the first entry, and calculate a depth for each of the first node's successors. If the preliminary new depth equals the prior depth, the processor 202, in block 512-b, replaces the original entry with the new entry to occupy the first node, and assign the preliminary new depth as the new depth of the first node while being occupied by the new entry. Further, if the preliminary new depth equals the prior depth plus 1 (i.e., value of one cost), the processor 202, in block 512-c, replaces the original entry with the new entry to occupy the first node, assigns the preliminary new depth as a new depth of the first node while being occupied by the new entry, and calculates a depth for each of the first node's successors.

Still in block 604, if the preliminary new depth is greater than the prior depth plus 1, the processor 202, in block 606, starts to search for a path with a minimum length of path for the new entry in the graph, wherein the length of path is defined as how many costs the new entry needs to travel from the first node to find an unoccupied node in the graph. If a path is found in block 606, then the detection of the loop has failed, which routes the method 600 to block 512. In block 512, the processor 202 replaces the original entry with the new entry to occupy the first node. Further the processor 202 assigns the length of the path as the new depth of the first node while being occupied by the new entry, and calculates a depth for each of the first node's successors and predecessors.

In some preferred embodiments, by executing the determining module 408, the processor 202 may implement an exemplary process described below to search for the path. If the preliminary new depth of the first node is D, D is the shortest possible path cost to an unoccupied node. So the processor 202 first tries to find any path with length D, then if the searching fails, the processor 202 tries to find any path with length D+1, and so on until the process either succeeds or fails. All visited nodes are marked with a backward depth from the first node, and the process can be thought of as a breadth first search backward from the first node to any unoccupied node. The backward depth for a current node is defined as how many costs for an entry to hop from the first node to the current node. For example, the first node is given a backward depth of 0. If a visited node is already marked with a backward depth, the process returns from that node indicating failure (i.e., a loop) and continues on other branches. The traversal runs from each node to all of its predecessors, but at each pass is only looking for a specific total path length, D, for the first iteration as explained above. The path length at a predecessor is simply the sum of the backward depth and forward depth of that node, so branches are only examined if they have the correct path length. A forward depth is the depth to a node from an empty node, which is concurrently maintained for all nodes. If a predecessor is found with a longer path length, it is put into a queue for that path length, to be processed later if no path is found with a shorter length. So at the end of the first round of iteration searching for a path with length D, the process continues with moving to a queue with the next higher path length and starting from all nodes in the queue.

Referring back to block 606, if a path is not found, then there may be very likely a loop existing which causes the method 600 routes to block 514. In block 514, the processor 202 keeps the original entry to occupy the first node, and saves the new entry into a stash of the Cuckoo hash table. The stash is a small extra piece of memory configured to store an entry that is not allowed to insert into the Cuckoo hash table.

More particularly, stashes are useful in several ways. One stash entry is required to be vacant, otherwise an entry addition request is immediately denied. This is because either adding the entry or relocating any of the evictees may result in nodes becoming unreachable, so the entry may be put in the stash instead. A second purpose is to reduce a probability of collision to happen for random distributed entries.

For example, for a 4-way hashtable with 1K entries per way, a stash of size 4 reduces the failure probability from $1\times10^{-9}$ to $1\times10^{-36}$, so a presence and a size of the stash have an extreme leverage on the collision probability. The third purpose of the stash is to allow overflow locations for entries whose hash addresses are not randomly distributed so may behave much worse than as above described.

This disclosed system and mechanism allow for the optimum application of the stash for the above purposes. In contrast to prior arts, where burdensome computation is required to properly use the stash, with this embodiment incorporating the stash may be easily implemented. An implementation of the stash can be considered to have two components: the first is the decision when to attempt to put one or more stash entries into the hashtable, and maybe also how hard to try; the second is the mechanism for determining whether a stash entry can be added and for actually adding it. In a preferred example to implement the stash in the disclosed system and mechanism, the most straightforward criteria for determining when to add a stash entry to the Cuckoo hash table is whenever an entry in the Cuckoo hash table is deleted; more specifically, when an entry is deleted, an attempt is made to add a stash entry to the Cuckoo hash table. A preferred embodiment may also be specified to try hard if the stash is full, otherwise don't try as hard. Another embodiment includes transferring a stash entry to the Cuckoo hash table when the stash gets full. A preferred method to add a stash entry to the Cuckoo hash table is the same as to add an entry. The method described herein proceeds in three phases. First, if one of its hashed locations (i.e., hash address) is unoccupied, the method will add the entry. Second, the test can be done to discriminate between whether the addition will create a loop, may create a loop, or definitely will not create a loop. If an option exists to try to add the entry but not try too hard, only add the entry if it definitely will not create a loop. Finally, the third step, taken only if trying hard, will be to attempt to add the entry if a loop may be created. Recall that when adding an entry, a chain of evictions may occur, and the above steps are done for the original entry and each evictee. A round-robin stash pointer is maintained of the stash entries. The pointer identifies a stash entry, an attempt is made to add it to the hashtable, whereupon it or an evictee might be kicked back to the stash and put in the location identified by the stash pointer. If that occurs, advance the stash pointer and try the next stash entry until success or all have been tried, or less aggressively, advance the stash pointer, so on the next stash transfer request, the next entry will be chosen.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
   maintaining, by a processor, a hash table that includes a plurality of memory locations to store a respective node in a graph, the respective node marking the memory location as being either: occupied if the memory location is storing an entry; or unoccupied if the memory location is not storing an entry;
   identifying, by the processor, a particular one of the memory locations to store a new entry;
   if the respective node of the particular memory location is marked as being unoccupied, then storing the new entry in the particular memory location by the processor;
   if the respective node of the particular memory location is marked as being occupied, then, by the processor, determining whether to store the new entry in the particular memory location, by:
      determining a first cost of relocating the stored entry to a different one of the memory locations, the first cost corresponding to a number of hops to reach an unoccupied node in the graph as a result of that relocation;
      determining a second cost of storing the new entry in an alternate memory location, the second cost corresponding to a number of hops to reach an unoccupied node in the graph as a result of that storing;
      comparing the first cost and the second cost; and
      based on the comparison, storing either the stored entry in the different one or the memory locations or the new entry in the alternate memory location.

2. The computer-implemented method of claim 1, wherein based on the comparison, storing the new entry in the different one or the memory locations or the alternate memory location further comprises:
   if the second cost is less than the first cost, replacing the stored entry with the new entry to occupy the particular memory location's respective node, assigning the second cost as a new depth of the particular memory location's respective node while being occupied by the new entry, and calculating a depth for each of nodes pointing to the particular memory location's respective node;
   if the second cost equals the first cost, replacing the stored entry with the new entry to occupy the particular memory location's respective node, and assigning the second cost as the new depth of the particular memory location's respective node while being occupied by the new entry; and
   if the second cost equals the first cost plus one cost, replacing the stored entry with the particular entry to occupy the particular memory location's respective node, assigning the second cost as a new depth of the particular memory location's respective node while being occupied by the new entry, and calculating a depth for each of nodes pointing to the particular memory location's respective node.

3. The computer-implemented method of claim 2, wherein determining whether to replace the stored entry further comprises:
  if the second cost is greater than the first cost plus one cost, searching for a path with a minimum length from the particular memory location's respective node to an unoccupied node in the graph, wherein the length of the path is configured as how many costs the new entry needs to travel from the particular memory location's respective node to find an unoccupied node in the graph.

4. The computer-implemented method of claim 3, wherein the searching comprises:
  if a path is found, replacing the stored entry with the new entry to occupy the particular memory location's respective node, assigning the length of the path as the new depth of the particular memory location's respective node while being occupied by the new entry, and calculating a depth for each of nodes pointing to the first node;
  if a path is not found, keeping the stored entry to occupy the first node, and saving the new entry into a stash of the Cuckoo hash table.

5. The computer-implemented method of claim 4, wherein the stash is configured to temporarily save an entry.

6. The computer-implemented method of claim 2, wherein determining whether to replace the stored entry further comprises: if a depth for a node is less than the first cost and there is no more than one node with nodes pointing to the node associated with the depth, saving an entry occupying the node into the stash of the Cuckoo hash table.

7. The computer-implemented method of claim 2, wherein determining whether to replace the stored entry further comprises: if a depth for a node equals the first cost and there is no more than one node with nodes pointing to the node associated with the depth, saving an entry occupying the node into the stash of the Cuckoo hash table.

8. A network device comprising:
  a first storage to store a hash table including a plurality of memory locations to store entries;
  a processor coupled to the first storage and configured to:
    maintain a hash table that includes a plurality of memory locations to store a respective node in a graph, the respective node marking the memory location as being either: occupied if the memory location is storing an entry; or unoccupied if the memory location is not storing an entry;
    identify, by a processor, a particular one of the memory locations to store a new entry;
    if the respective node of the particular memory location is marked as being unoccupied, then store the new entry in the particular memory location; and
    if the respective node of the particular memory location is marked as being occupied, then, by the processor, determine whether to store the new entry in the particular memory location, by:
      determining a first cost of relocating the stored entry in a different one of the memory locations, the first cost corresponding to a number of hops to reach an unoccupied node in the graph as a result of that relocation;
      determining a second cost of storing the new entry in an alternate memory location, the second cost corresponding to a number of hops to reach an unoccupied node in the graph as a result of the storing;
      comparing the first cost and the second cost and based on the comparison, storing either the stored entry in the different one or the memory locations or the new entry in the alternate memory location.

9. The network device for processing packets of claim 8, wherein the processor determines that if the second cost is equivalent to or less than the first cost plus one cost value, the processor evicts the stored entry from the node and adds the new entry to the particular memory location's respective node.

10. The network device for processing packets of claim 8, wherein the processor determines that if the second cost is greater than the first cost plus one cost value, the processor initiates to find a path, from the particular memory location's respective node in the graph, associated with a minimum depth.

11. The network device for processing packets of claim 10, wherein if the path is found, the processor replaces the stored entry with the new entry to occupy the node, and concurrently updates a depth for each of the nodes pointing to the particular memory location's respective node.

12. The network device for processing packets of claim 10, wherein if the path is not found, the processor retains the stored entry to occupy the particular memory location's respective node and allocates the new entry to a stash in the hash table.

13. A non-transitory, computer readable storage device containing executable instructions that, when executed by a processor, causes the processor to:
  maintain a hash table that includes a plurality of memory locations to store a respective node in a graph, the respective node marking the memory location as being either: occupied if the memory location is storing an entry; or unoccupied if the memory location is not storing an entry;
  identify a particular one of the memory locations to store a new entry;
  if the particular memory location is marked by its respective node as being unoccupied, then store the new entry in the particular memory location; and
  if the particular memory location is marked by its respective node as being occupied by a saved entry, then determine whether to store the new entry in the particular memory location, by:
    determining a first cost of relocating the stored entry in a different one of the memory locations, the first cost corresponding to a number of hops to reach an unoccupied node in the graph as a result of that relocation;
    determining a second cost of storing the new entry to an alternate memory location, wherein the second cost corresponds to a number of hops to reach an unoccupied node in the graph as a result of that storing;
    comparing the first cost and the second cost; and
    based on the comparison, storing either the stored entry in the different one or the memory locations or the new entry in the alternate memory location.

14. The non-transitory, computer readable storage device of claim 13 wherein the instructions causes the processor to:
  if the second cost is less than the first cost, replace the stored entry with the new entry to occupy the particular memory location's respective node, assign the second cost as a new depth of the particular memory location's respective node while being occupied by the new entry, and calculate a depth for each of nodes pointing to the first node;
  if the second cost equals the first cost, replace the stored entry with the new entry to occupy the first node, and assign the second cost as the new depth of the particular memory location's respective node while being occupied by the stored entry;

if the second cost equals the first cost plus one cost, replace the stored entry with the new entry to occupy the particular memory location's respective node, assign the second cost as a new depth of the particular memory location's respective node while being occupied by the new entry, and calculate a depth for each of nodes pointing to the particular memory location's respective node; and if the second cost is greater than the first cost plus one cost, search for a path, associated with a minimum length, from the first node to an unoccupied node in the graph;

wherein the length of the path is configured as how many costs the particular entry needs to travel from the first node to find an unoccupied node in the graph.

15. The non-transitory, computer readable storage device of claim 14 wherein the instructions causes the processor to search for the path from the first node to an unoccupied node in the graph further comprises:

if a path is found, replacing the stored entry with the new entry to occupy the particular memory location's respective node, assigning a length of the path as the new depth of the particular memory location's respective node while being occupied by the new entry, and calculating a depth for each of nodes pointing to the particular memory location's respective node;

if a path is not found, keeping the different entry to occupy the particular memory location's respective node, and saving the particular entry into a stash of the hash table.

16. The non-transitory, computer readable storage device of claim 15 wherein the stash is configured to temporarily save an entry.

* * * * *